United States Patent
Tatman et al.

(10) Patent No.: US 8,374,599 B2
(45) Date of Patent: Feb. 12, 2013

(54) SYSTEM AND METHOD FOR MEASURING PERFORMANCE OF NEW SERVICES IN CONSUMER DEVICES

(75) Inventors: Lance A. Tatman, Granite Bay, CA (US); Jerry J. Liu, Sunnyvale, CA (US); Glenn R. Engel, Snohomish, WA (US); Glen L. Purdy, Jr., Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1876 days.

(21) Appl. No.: 11/397,082

(22) Filed: Apr. 3, 2006

(65) Prior Publication Data

US 2007/0232289 A1 Oct. 4, 2007

(51) Int. Cl.
 *H04W 24/00* (2009.01)
 *H04B 17/00* (2006.01)

(52) U.S. Cl. .................................. 455/425; 455/67.11

(58) Field of Classification Search .................... 455/423
 See application file for complete search history.

(56) References Cited

U.S. PATENT DOCUMENTS

| | | | |
|---|---|---|---|
| 5,625,668 A | 4/1997 | Loomis et al. | |
| 5,805,666 A | 9/1998 | Ishizuka et al. | |
| 5,987,306 A | 11/1999 | Nilsen et al. | |
| 6,088,588 A | 7/2000 | Osborne | |
| 6,308,071 B1 | 10/2001 | Kalev | |
| 6,434,364 B1 | 8/2002 | O'Riordain | |
| 6,445,916 B1* | 9/2002 | Rahman | 455/423 |
| 6,567,381 B1* | 5/2003 | Jeon et al. | 455/423 |
| 7,043,237 B2 | 5/2006 | Snyder et al. | |
| 2001/0041566 A1 | 11/2001 | Xanthos et al. | |
| 2001/0049263 A1 | 12/2001 | Zhang | |
| 2002/0069037 A1 | 6/2002 | Hendrickson et al. | |
| 2003/0162539 A1* | 8/2003 | Fiut et al. | 455/424 |
| 2006/0234698 A1* | 10/2006 | Fok et al. | 455/425 |
| 2007/0041330 A1* | 2/2007 | Bostica et al. | 370/252 |
| 2007/0130306 A1* | 6/2007 | Ofel | 709/223 |
| 2007/0213038 A1* | 9/2007 | Masseroni et al. | 455/414.3 |
| 2007/0254644 A1* | 11/2007 | Dobson et al. | 455/423 |
| 2008/0056198 A1* | 3/2008 | Charpentier et al. | 370/332 |

FOREIGN PATENT DOCUMENTS

| | | |
|---|---|---|
| JP | 2001127693 | 5/2001 |
| WO | WO 2004072820 A2 * | 8/2004 |

* cited by examiner

*Primary Examiner* — George Eng
*Assistant Examiner* — Tangela T. Chambers

(57) ABSTRACT

In a communication network architecture, a service provider monitors its customer's experience as the customer selects and uses services offered by the service provider. An agent, such as software installed on-board the customer's mobile equipment, measures parameters that are related to the services, and communicates the measured parameters to the service provider, over the communication network.

24 Claims, 2 Drawing Sheets

SYSTEM AND METHOD FOR MEASURING PERFORMANCE OF NEW SERVICES IN CONSUMER DEVICES

BACKGROUND OF THE INVENTION

The invention relates to the field of telecommunications, and particularly to wireless communication networks. Among other areas, it has applicability to networks such as GPRS and IDEN, and networks according to the IEEE 802.11 standard.

In a typical communications architecture, users are coupled for communication with one or more nodes, such as base stations, servers, etc., which, in turn, are coupled for communication with public communication networks such as the Internet, and which support technology coverage areas within the network. Communications between such users pass through their respective base stations, and across the public networks. Such users employ mobile equipment, such as laptop or other portable computers, cellular telephones, etc.

A service provider provides various types of services to its customers. A service provider will provide a menu of available services, from which the customer chooses. Examples of such available services include Short Message Service (SMS) and Multimedia Message Service (MMS). From time to time, the service provider will make new services available to its customers. Before a service provider deploys the new service, they generally will want to perform a test and validation of the service. Examples of such functions to be tested and validated include service activation and service performance. Validation may be needed on a variety of different types of mobile equipment.

Various sets of operating parameters are associated with the respective services. A service provider supporting a given service will need access to data regarding that service provided to its customers. Service providers conventionally have used specialized test equipment and performed "drive" tests to measure network performance both inside and outside of their network. The service provider accesses the data by monitoring the various system infrastructure components at the base stations and elsewhere in the network. Service providers conduct surveys of their customers to understand, for instance, the service level and performance quality provided under the service offerings. Test labs are also set up to simulate the expected environments. However, these methods have had the drawback that they cannot directly measure customer experience.

Service providers conventionally have very limited or no visibility into the performance of the network and services being used by their customers, especially when trying to ascertain the performance of new services being used by early adopters of the new services. At such times, the service providers need information on such new service performance, in order to handle problems, and otherwise to be responsive to their customers' needs.

This drawback also becomes important as customers switch between different services offered by the service provider, particularly as they switch to new service offerings. The user's operation of the mobile equipment is outside of the service provider's control, so the service provider conventionally has little or no insight as to the level of service the customer is receiving. For an old, established service, the service provider may have a "track record" of the service's performance. However, for a new service offering, the service provider must depend on getting timely, detailed and complete information on its customers' experience with the new service offering. The service provider's inability to obtain information directly reflective of the service's performance, as the user experiences it, disadvantageously limits the service provider's ability to provide the customer with effective support, and may delay the deployment of new services.

SUMMARY OF THE INVENTION

The customer's mobile equipment includes an agent, such as a software agent installed on-board the mobile equipment, that measures parameters related to the performance of the mobile equipment in the communication network architecture, as the customer selects and uses services made available by the service provider. The mobile equipment transmits the measured parameters, through the communication network, to the service provider.

The service provider thus has direct access to the performance of the system from the mobile equipment user's perspective, and is able to use that information to improve service to the customer. Service providers can have real-time or near real-time data available to understand the performance of a service from the perspective of their customer's experience using the service, when the customer is using a new service offering, or switching between an old service offering and the new service offering.

Further features and advantages of the present invention, as well as the structure and operation of preferred embodiments of the present invention, are described in detail below with reference to the accompanying exemplary drawings.

GLOSSARY

For the description of the present invention, the following terms shall have the meanings here set forth:

"Agent" means a piece of autonomous or semi-autonomous proactive and reactive, computer software residing on the mobile device. Many individual communicative software agents may form a multi-agent system.

"Base Station" means a network node, server, etc., generally provided and operated by a service provider, for facilitating user communication over a communication network.

"Customer" means an individual or other party who possesses communication equipment, such as a cell phone or laptop computer, and who subscribes with a service provider for network communication services. The terms "user" and "mobile user" are used interchangeably with "customer."

"Home service provider" means, with reference to a given customer, a service provider with which the customer has a subscription for network communication service.

"Mobile equipment" or "mobile device" means a piece of equipment, owned or possessed by a customer of a service provider, or by the service provider and their employees ("user"), having capability of communicating over the communication network, and which the user can, pursuant to the use of the mobile equipment, transport the mobile equipment from place to place and use it in those respective places. The terms "mobile device" and "mobile equipment" are used interchangeably.

"Networking technology" means a communication technology, standard, protocol, format, etc, which a given service provider employs to enable communication over a communication network. Examples of networking technologies include General Packet Radio Service (GPRS) and Integrated Enhanced Digital Network (IDEN).

"Service" or "Service Offering" means, broadly, a resource provided to network clients such as customers or other users.

"Service provider" means a party which maintains equipment and means for transmitting and receiving communications over a communication network, and which offers subscriptions to customers, pursuant to which the customers utilize the service provider's equipment and means for transmitting and receiving, to communicate over the communication network.

DETAILED DESCRIPTION

Figure 1:
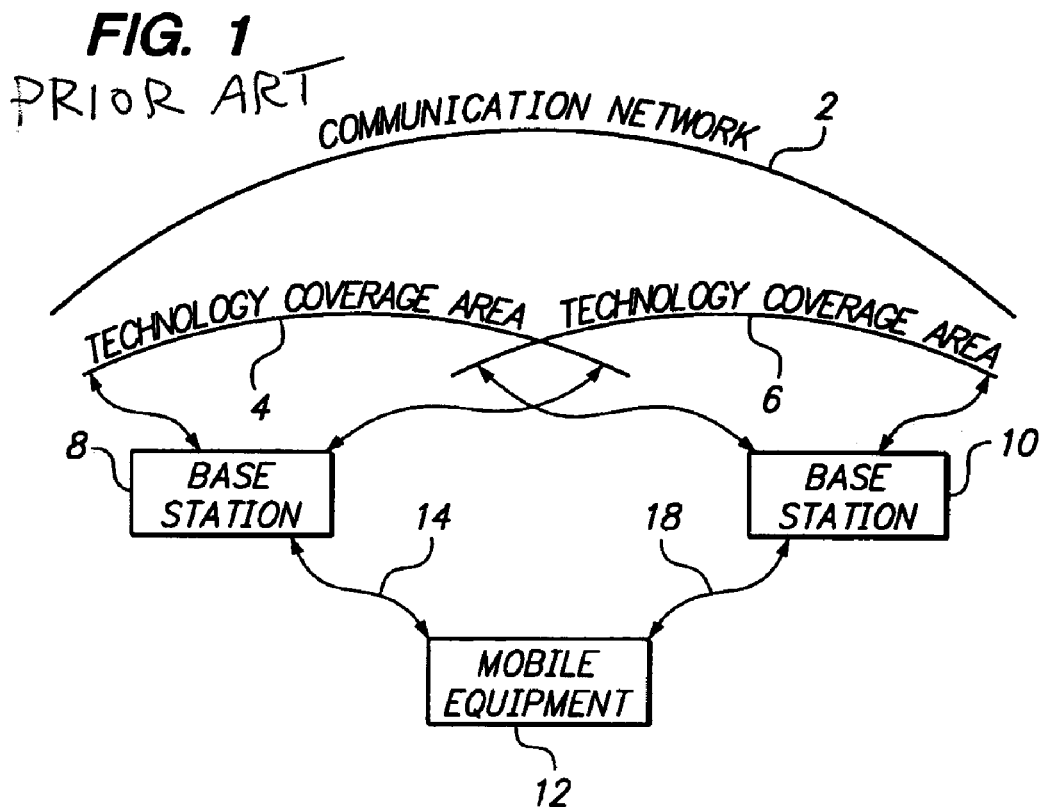
FIG. 1 is a block diagram showing an example of a broadband communications architecture, within which the invention is practiced.

An example of an environment, in which various embodiments of the invention may be practiced, is illustrated by the block diagram of FIG. 1. A communication network 2 covers a region, such as a geographical region, over which first and second service providers provide coverage within respective technology coverage areas 4 and 6. Service provider server equipment, shown schematically as base stations 8 and 10, are provided, within the respective technology coverage areas 4 and 6, to facilitate user communications. A customer of the first service provider communicates with the base station 8 for access to the communication network 2 by means of a wireless or other communication link 14.

For the purpose of describing the invention, the first service provider will be referred to as the "home service provider," as per the definition in the Glossary, above.

The home service provider includes a store of information regarding the provided services, and customers' history of experience using the services. As parameter information is transmitted to the home service provider from the mobile equipment 12, the reported information is added to the store. The exact nature of the store depends on the particular type of system support architecture the home service provider employs, and need not be described in detail herein. It will be generally understood, however, that if a service has been offered for a significant length of time and has a substantial "track record" of user experience, the store will contain a considerable amount of information as to that service. By contrast, if a service is newly made available, there will be little or no information in the store about that service, at first. For the purpose of the description and claims set forth herein, two different services, for instance an old service and a new service, have different amounts of user experience archived in the store.

The customer employs mobile equipment, generally shown as mobile equipment 12. The mobile equipment 12 communicates, for instance, through a link 18 to the base station 10, and over the communication network 2 to the home service provider. The mobile equipment 12 includes, among its various possible embodiments, a processor, memory, and a wireless communication interface. For instance, the mobile equipment 12 might include a laptop computer, cell phone, handheld "personal digital assistant" unit, or wireless sensor.

A conventional system which can only perform drive tests, will provide a severe under-sampling, in both time and space, of the mobile equipment 12's performance. Also, such conventional methods did not provide measurements from a customer perspective. That is, the measurements available to the service provider were not necessarily accurately reflective of the performance the mobile equipment 12 actually experienced.

In one embodiment of the invention, measurements are made at the location where a service provider's employees are, and at the time when the employee is using the mobile equipment 12. The measurements are taken at, or on-board, the mobile equipment 12. As a consequence, the service provider can have a much better representation of expected consumer experience for the tested service and further gains the capability to more quickly enhance and perfect the service offering before it is ever offered to a subscriber.

In another embodiment of the invention, measurements are made at the location where the customer is, and at the time when the customer is using the mobile equipment 12. The measurements are taken at, or on-board, the mobile equipment 12. Thus, the service provider has clear visibility of their customer's experience as the customer changes to, or employs, new services. As a consequence, a much better representation of customer experience is provided, than with conventional systems, which do not make this information available to the service providers.

The mobile equipment 12 further includes means, shown as an agent 13, for measuring parameters, changing the parameters to be measured, and preparing and sending parameter measurement reports. Embodiments of the agent 13 are described in detail herebelow.

An embodiment of the invention includes the following:
A. Software agent installed or installable on the customer device
  1. Agent is capable of communicating with a home provider's server.
  2. Agent is capable of storing measurements for some period of time.
  3. Agent is capable of making measurements useful to the home provider.
B. Server to configure agents and collect data.

Figure 2:
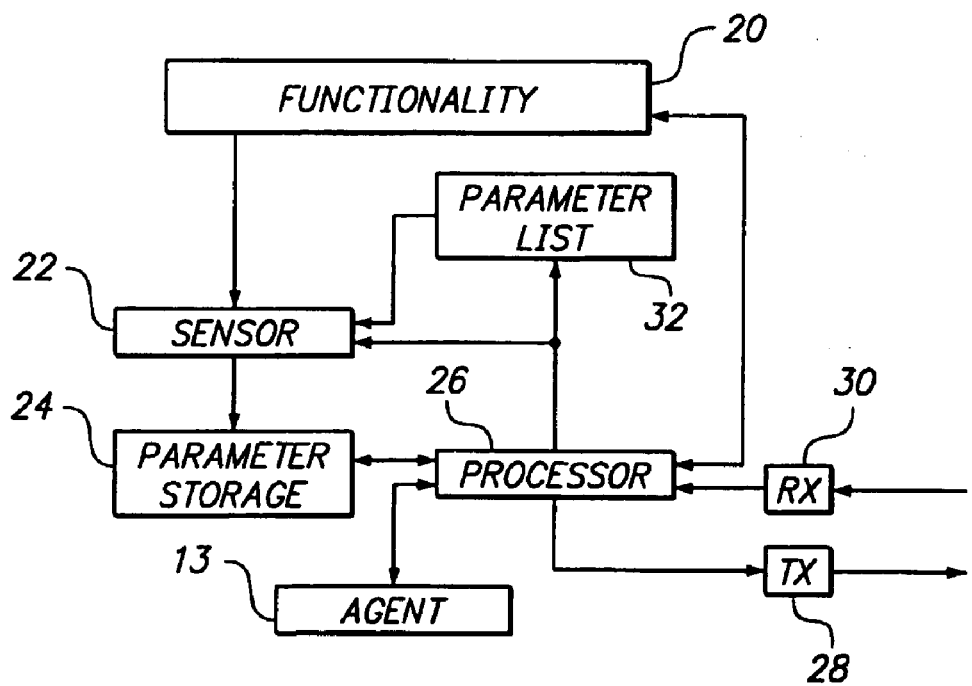
FIG. 2 is a block diagram showing a more detailed implementation of a piece of mobile equipment in accordance with the invention.

FIG. 2 is a block diagram of the piece of mobile equipment 12 of FIG. 1, such as a laptop computer or cell phone, illustrating one embodiment of the agent of the invention.

The mobile equipment 12 has a general functionality 20, whose nature depends on what type of equipment it is. For instance, if the mobile equipment 12 is a laptop computer, its general functionality 20 will include data storage and processing capability, a user interface, etc. A cell phone's general functionality 20 would include voice telecommunications. The user interface is not separately shown in FIG. 2, but is understood generally to be part of the general functionality 20. The embodiment of the invention further includes an agent 13, to be described in detail herebelow.

As the mobile equipment 12 operates, its operating parameters are sensed by a sensor 22, and stored in parameter storage 24. A processor 26 handles the parameters, and transmits the parameters, through a transmitter including a transmit interface 28, over the communication network. The sensor 22 can include a hardware sensor, a software implementation for obtaining the sensed parameter values, or a suitable combination of both.

In another embodiment of the invention, a receive interface 30 receives signals from the network, which may, for instance, include a command to employ a new service. Alternatively, such command signals can come from the user interface portion of the general functionality 20, when the user enters a command to select a service. The signals are provided to the processor 26, which interprets the signals appropriately, to identify the technology employed.

The processor 26 then accesses a parameter list 32, which contains sets of parameters that are appropriate for various service offerings. The processor 26 then configures the sensor 22, to receive the sensed parameter signals that are appropriate for the service being employed. In so doing, the processor 26 serves as a selector for selecting parameters for measurement.

Figure 3:
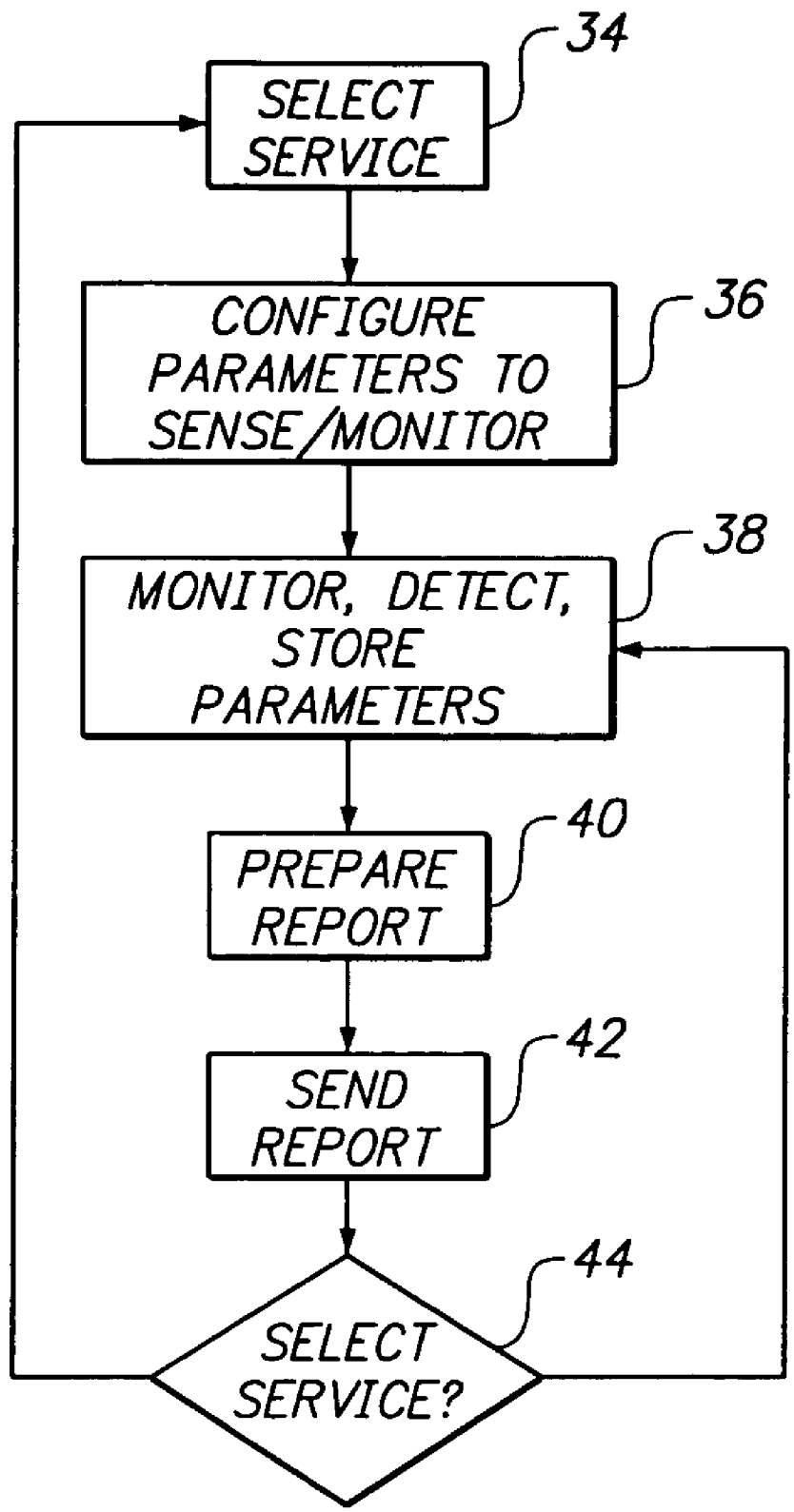
FIG. 3 is a flowchart showing operation of a method according to the invention.

FIG. 3 is a block diagram of a method of operation, according to an embodiment of the invention.

In an activity 34, a service is selected, from among service offerings made available to the user by the home service provider. It will often be the case that the user selects a service, using a user interface provided with the mobile equipment 12 (not specifically shown in FIG. 2, but generally understood to be part of the functionality 20). However, alternatively, the agent 13 can initiate and test new services responsive to the service provider sending a command to do so over the communication network to the mobile equipment 12, or responsive to the agent 13's programming, as well as responsive to the user selecting the new services.

As the user uses various services, the agent 13 automatically switches over to a configuration appropriate for the newly selected service, by configuring itself (36) to make measurements of the parameters appropriate for the selected service (38). The agent 13 may take measurements of the user's use of the service passively, or it may initiate the service itself and generate active measurements. The agent 13 is capable of being programmed to initiate and test new services, changing the parameter measurements to be appropriate for the service being used. Assuming a service provider has already installed software agents on its customer devices, the agent 13 can be configured to make measurements continuously at intervals, or do so when the customer uses the device. For example, measurements that may be taken by an agent within a GPRS network include, but are not limited to:

Length of time software applications are in the foreground (applications such as a Web browser, an e-mail tool, phone, etc.)
General Packet Radio Service (GPRS) state
Packet Data Protocol (PDP) state
Transmission Control Protocol (TCP) Cold Connect time
TCP warm connect time
E-mail one-way delay
Wireless Application Protocol (WAP) and HyperText markup language (HTML) page download time
User Datagram Protocol (UDP) cold round trip time
UDP warm round trip time
Global Mobile (Communications) System (GMS) and/or Multimedia Message Service (MMS) one-way delay
TCP transmit rate
TCP receive rate
Signal strength in dBm
Percentage of battery power remaining
Absolute radio frequency channel number (ARPCN)
Base station identity code (BSIC)
Cell ID
Routing area code (RAC)
Time and/or date
Geographical location
Call Duration
Call Error Messages
SMS Send Time Sensed parameters from the mobile equipment 12 are reported from the mobile equipment 12 to the home service provider, via its base station 10 and the communication network 2. This may be done at specified time intervals, in response to predetermined values of predetermined parameters when the predetermined values are sensed, in response to a request from the service provider's server equipment, accumulation of a predetermined quantity of parameters, the detection of a change in network technology such as by crossing a technology coverage area boundary, or at other times which the system architect may choose The agent 13 prepares reports of the parameters it has monitored and detected (40). The agent 13 sends the parameter reports (42) at specified intervals, in response to requests from the home service provider received over the communication network 2 through the receive interface 30, as the parameters are sensed, etc.

For instance, in the implementation of FIG. 3, the parameters are accumulated until one of the above-stated conditions is met. If it is not yet time to send the parameter report, then parameter sensing continues. If it is time to send a report, then the agent 13 prepares a parameter report (40). For instance, in one embodiment the processor 26 prepares the parameter report, by following its pre-programmed instructions and/or the agent 13's configuration settings. Preparing the parameter report may include packaging the sensed parameters into a data packet for transmission pre-processing the parameters, etc. Pre-processing may include summarizing the sensed parameters, calculating statistics, averaging, flagging noteworthy sensed parameter values, etc.

The parameter report is then transmitted (42), for instance through the transmit interface 28. The agent 13 continues sensing the parameters, storing and accumulating the sensed parameters, etc., by again executing the activity 38.

In an activity 44, the agent 13 determines whether there is to be a change in the service to be employed. Preferably, a comparison is done between the currently selected service and the service previously selected. If there is no difference, then the agent 13 maintains the current parameter configuration, and continues to operate as before. If there is a difference, then the agent 13 concludes that a new service is being selected. Additionally, if more than one service is to be active simultaneously, the agent 13 may monitor parameter sets appropriate for all active services which are of interest to the service provider.

The agent 13 then consults the parameter list 32, to determine what parameters are to be sensed and/or changed in the new service (36). The agent 13 then reconfigures the sensor 22, as appropriate, to begin sensing the parameters that are appropriate for the new service (38). In addition to different parameters, the agent 13 may also employ additional code modules that are activated responsive to detection of such new technology.

In another embodiment, the agent 13 may receive new parameters, new code modules, etc., from outside the mobile equipment 12, such as by receiving suitable communications through the receive interface 30.

Then, the agent 13 resumes sensing parameters. In one embodiment, the agent 13 performs the process of FIG. 3 continuously, as a background or base level task.

These measurements may be used by the home service provider for many different applications, such as verification of service performance or planning for extensions to service coverage. This system could also be used to decrease new service time-to-market by deploying these agents to friendly users or home service provider employees to increase the provider's data points on performance and therefore confidence in the service being deployed.

The agent 13 awaits commands to change services (44). Such commands can come from the user via the user interface of the mobile equipment 12 as described above, from the home service provider over the communication network 2, or from the agent 13's own internal programming.

Different measurements can be taken, and would be needed for different networking technology. For example, for Integrated Digital Enhanced Network (IDEN) networks, the following are examples of measurements that may be taken:

Loss
Latency
Jitter
Time Viewed
Channel/Program Viewed

As the customer goes about his/her business, their mobile device will be taking measurements and either storing them on the device for later transmission to the service provider, or it will be transmitting the measurements at particular intervals, using the network 2 as the communications medium.

Conventionally, the service provider would normally be blind to the performance the user is experiencing. However, because the measurements are being taken from the mobile equipment 12, the customer is independent of the network, and the measurements can be provided back to the home service provider's system. This data may be used by the home service provider for many different applications, such as verification of network service performance and verification or planning for extension to network coverage.

Because these agents may be employed on a large number of mobile devices, some implementations likely will encounter issues with scaling. Conventionally, installing agents on all of a service provider's customer devices would lead to a solution that could not scale. Also, because the agents will reside on consumer devices, there will be issues with privacy. Systems and methods which include embodiments of the present invention may advantageously address these issues, by employing techniques, such as those disclosed in the patent applications here listed:

Ser. No. 10/047,240 Method and System for Improved Monitoring Measurement and Analysis of Communication Networks Utilizing Dynamically and Remotely Configurable Probes Ser. No. 10/736,653 Wireless Probe Management System Ser. No. 11/230,774 Technique for Management Allowing Anonymous Probe Configuration Allowing Anonymous Probe Identity Ser. No. 11/230,895 Selective Distribution Of Measurement Device Behavior In a Loosely Coupled Autonomous System Ser. No. 09/884,353 Configuring Devices Using Server Responses Ser. No. 10/698,292 Bandwidth Management Using Statistical Measurement Ser. No. 10/306,940 Systems and Methods for Measurement and/or Control Using Mobile Probes Ser. No. 10/829,091 Methods and devices for configuring mobile applications based on specifications defining regions in multidimensional coordinates.

Ser. No. 09/020,630 Transducers with Electronic Data Sheets That Enable Transducer Access Using Multiple Type of Transducer Object Models Ser. No. 10/909,051 Method and System for Treating Events and Data Uniformly Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A parameter measurement system, for measuring parameters accessible by mobile equipment which communicates over a communication network, the communication network including a network service provider, the network service provider having first and second services available for use by the mobile equipment, the system comprising:
   an agent which includes:
      (i) measuring means for measuring predetermined parameters of operation of the mobile equipment regarding one of the first and second services, and for detecting a change of service;
      (ii) means for changing measurement parameters to make parameter measurements appropriate for a detected change of service; and
      (iii) a transmitter for transmitting measured parameters over the communication network;
   wherein the first and second services are resources provided to network clients such as customers or other users, taken from the group of services consisting of:
   General Packet Radio Service (GPRS);
   Packet Data Protocol (PDP);
   Transmission Control Protocol (TCP);
   E-mail;
   Wireless Application Protocol (WAP);
   HyperText markup language (HTML);
   User Datagram Protocol (UDP);
   Global Mobile (Communications) System (GMS);
   Short Message Service (SMS); and
   Integrated Digital Enhanced Network (IDEN).

2. A system as recited in claim 1, wherein the mobile equipment includes a processor, memory, and a wireless communication interface.

3. A system as recited in claim 2, wherein the mobile equipment includes one of (i) a cellular telephone, (ii) a portable computer, (iii) a handheld personal digital assistant unit, and (iv) a wireless sensor.

4. A system as recited in claim 1, wherein the agent is included within the mobile equipment.

5. A system as recited in claim 1, wherein the agent includes parameter storage for accumulating measurements of the parameters, and storing the measurements as the measurements accumulate.

6. A system as recited in claim 5, wherein the agent stores the accumulated measurements of the parameters for one of (i) until a predetermined quantity of parameters have been accumulated, and (ii) until a change in service is detected.

7. A system as recited in claim 1, wherein the agent further comprises a processor for preprocessing the measured parameters before transmitting the measured parameters.

8. A system as recited in claim 1, wherein the agent further includes:
   (i) a user interface to enable a user to select a service, and
   (ii) sets of parameters suitable for different services, including a parameter set from which parameters are selected for measurement based on the service selected by the user.

9. A system as recited in claim 8, wherein the service provider has a first store of previous user experience regarding the first service, and the service provider has a second store of previous user experience regarding the second service, the second store being smaller than the first store.

10. A system as recited in claim 8, wherein the agent further comprises a transmitter for transmitting the selected parameters over the communication network, responsive to a received request for transmission of the parameters.

11. A system as recited in claim 8, wherein the agent further comprises a selector for selecting parameters for measurement, responsive to one of (i) a command to do so received over the communication network; and (ii) an elapsed time.

12. A system as recited in claim 1, further comprising a service provider node of the network service provider which is coupled for communication with the mobile equipment over the communication network, and which receives the measured parameters.

13. A method for measuring parameters accessible by mobile equipment which communicates over a communication network, the communication network including a network service provider, the network service provider having first and second services available for use by the mobile equipment, the method comprising:
   (i) measuring predetermined parameters of operation of the mobile equipment regarding one of the first and second services, and for detecting a change of service;
   (ii) changing measurement parameters to make parameter measurements appropriate for a detected change of service, and
   (iii) transmitting measured parameters over the communication network;
   wherein the first and second services are resources provided to network clients such as customers or other users, taken from the group of services consisting of:
   General Packet Radio Service (GPRS);
   Packet Data Protocol (PDP);
   Transmission Control Protocol (TCP);
   E-mail;
   Wireless Application Protocol (WAP);
   HyperText markup language (HTML);
   User Datagram Protocol (UDP);
   Global Mobile (Communications) System (GMS);
   Short Message Service (SMS); and
   Integrated Digital Enhanced Network (IDEN).

14. A method as recited in claim 13, wherein the mobile equipment includes a processor, memory, and a wireless communication interface.

15. A method as recited in claim 14, wherein the mobile equipment includes one of (i) a cellular telephone, (ii) a portable computer, (iii) a handheld personal digital assistant unit, and (iv) a wireless sensor.

16. A method as recited in claim 13, wherein the mobile equipment includes an agent which performs the measuring and the transmitting.

17. A method as recited in claim 13, further comprising accumulating measurements of the parameters, and storing the measurements as the measurements accumulate.

18. A method as recited in claim 17, wherein storing includes storing the accumulated measurements of the parameters for one of (i) until a predetermined quantity of parameters have been accumulated, and (ii) until a change in service is detected.

19. A method as recited in claim 13, further comprising preprocessing the measured parameters; and transmitting the measured and preprocessed parameters.

20. A method as recited in claim 13, wherein:
   the method further comprises receiving a user command to select a service, the user command entered by the user through a user interface of the mobile equipment,
   the mobile equipment includes sets of parameters suitable for different services, and
   the method further comprises selecting a parameter set, from the sets of parameters, for measurement based on the service selected by the user.

21. A method as recited in claim 20, wherein the service provider has a first store of previous user experience regarding the first service, and the service provider has a second store of previous user experience regarding the second service, the second store being smaller than the first store.

22. A method as recited in claim 20, further comprising transmitting the selected parameters over the communication network, responsive to a received request for transmission of the parameters.

23. A method as recited in claim 20, further comprising selecting parameters for measurement, responsive to one of (i) a received command to do so; and (ii) an elapsed time.

24. A method as recited in claim 13, wherein:
   a service provider node of the network service provider is coupled for communication with the mobile equipment over the communication network; and
   the method further comprises the service provider receiving the measured parameters.

* * * * *